US 6,606,679 B2

(12) United States Patent
Solomon et al.

(10) Patent No.: US 6,606,679 B2
(45) Date of Patent: Aug. 12, 2003

(54) SOFTWARE TRANSPARENT SYSTEM AND METHOD FOR PEER-TO-PEER MESSAGE ROUTING (75) Inventors: Gary A. Solomon, Acton, MA (US); Joseph A. Schaefer, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/997,441

(22) Filed: Nov. 28, 2001

(65) Prior Publication Data

US 2003/0037199 A1 Feb. 20, 2003

Related U.S. Application Data (60) Provisional application No. 60/313,875, filed on Aug. 20, 2001.

(51) Int. Cl.$^7$ .......................... G06F 13/38; G06F 15/16; H04L 12/28
(52) U.S. Cl. .......................... 710/314; 710/316; 709/249; 370/401
(58) Field of Search .......................... 710/314, 3, 306, 710/36, 100, 104, 305, 316, 313; 709/232, 220, 203, 238, 249; 703/25, 27; 340/825.52, 2.1; 713/100; 370/400–402, 254, 362, 392, 351, 388, 419, 910; 345/501

(56) References Cited

U.S. PATENT DOCUMENTS

| 5,386,417 | A | * | 1/1995 | Daugherty et al. |
| 5,687,388 | A | * | 11/1997 | Wooten et al. |
| 5,802,318 | A | * | 9/1998 | Murray et al. |
| 5,991,824 | A | | 11/1999 | Strand et al. |
| 6,233,641 | B1 | | 5/2001 | Graham et al. |
| 6,256,314 | B1 | * | 7/2001 | Rodrig et al. |
| 6,289,015 | B1 | * | 9/2001 | Warner et al. |
| 6,430,626 | B1 | * | 8/2002 | Witkowski et al. |

OTHER PUBLICATIONS

PCI–to–PCI Bridge Architecture Specification, Rev. 1.1, Dec. 18, 1998, Chapters 1–4, 66 pages.
"Programmable logic devices in a switche PCI bus system", L.K. Wong, XP–000833818, May 1998, pp. 69–70, 72.

* cited by examiner

Primary Examiner—Gopal C. Ray
(74) Attorney, Agent, or Firm—Paul G. Nagy (57) ABSTRACT Disclosed are a system and method of transmitting data in a processing platform. A switch may comprise an upstream port coupled to a root device to communicate with a processing system. The switch may also comprise a plurality of downstream ports where each downstream port is adapted to be coupled to a device. Data may be transmitted between downstream ports based upon routing information for transmitting data from the upstream port to each of the downstream ports.

50 Claims, 5 Drawing Sheets

SOFTWARE TRANSPARENT SYSTEM AND METHOD FOR PEER-TO-PEER MESSAGE ROUTING

This application claims the benefit of the filing date of U.S. Provisional application Ser. No. 60/313,875 filed on Aug. 20, 2001 under 35 U.S.C. §119 (e).

BACKGROUND

1. Field

The subject matter disclosed herein relates to processing platforms. In particular, the subject matter disclosed herein relates to processing platforms comprising input/output (I/O) devices.

2. Information

Processing platforms typically comprise a host processing system, peripheral devices and an I/O system that enables communication between processes hosted on the host processing system and the peripheral devices. Such an I/O system is typically formed according to one or more standard I/O architectures such as, for example, the peripheral components interconnect (PCI) architecture according to the PCI Local Bus Specification, Rev. 2.2, Dec. 18, 1998, which is promoted by the PCI Special Interest Group.

To allocate resources to communicate with peripheral devices through an I/O system, a host processing system typically executes an enumeration procedure. An enumeration procedure typically polls elements of the I/O system and peripheral devices according to a protocol to extract identification information and resource requirements. The enumeration procedure may then allocate resources by, for example, allocating a portion of system memory for use by peripheral controllers and device drivers, and establishing data buffers in a system memory of the host processing system.

As requirements of future processing platform architectures evolve, the architectures of complementary I/O systems will evolve, enabling increased performance and functionality to meet these requirements of the future processing platform architectures. Nevertheless, there is a desire to maintain commonality between newer I/O system architectures and legacy I/O systems to allow for graceful transitions to the newer I/O system architectures.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations one or more data objects. However, this is merely an example of machine-readable instructions and embodiments of the present invention are not limited in this respect.

"Machine-readable medium" as referred to herein relates to media capable of maintaining expressions which are perceivable by one or more machines. For example, a machine readable medium may comprise one or more storage devices for storing machine-readable instructions. However, this is merely an example of a machine-readable medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise processing circuitry in combination with machine-executable instructions stored in a memory. However, these are merely examples of structures which may provide logic and embodiments of the present invention are not limited in this respect.

A "processing system" as discussed herein relates to a combination of hardware and software resources for accomplishing computational tasks. However, this is merely an example of a processing system and embodiments of the present invention are not limited in this respect. A "host processing system" relates to a processing system which may be adapted to communicate with a "peripheral device." For example, a peripheral device may provide inputs to or receive outputs from an application process hosted on the host processing system. However, these are merely examples of a host processing system and a peripheral device, and embodiments of the present invention are not limited in this respect.

A "data bus" as referred to herein relates to circuitry for transmitting data between devices. For example, a data bus may transmit data between a host processing system and a peripheral device. A data bus may be coupled to communicate with a plurality of devices where each device is located at a physical address on the data bus. However, these are merely examples of a data bus and embodiments of the present invention are not limited in these respects. A "bus transaction" as referred to herein relates to an interaction between devices coupled in a bus structure wherein one device transmits data addressed to the other device through the bus structure. For example, a first device may initiate a bus transaction with a second device coupled to the data bus located at a physical address on the data bus. A data bus may be coupled to more than two devices where each device is located at a physical address on the data bus. Accordingly, a first device may initiate a bus transaction with any destination device out of a plurality of other devices coupled to the data bus by addressing the bus transaction to the physical address associated with the destination device. However, this is merely an example of a bus transaction and embodiments of the present invention are not limited in this respect.

A "serial link" as referred to herein relates to circuitry to transmit data between devices. A serial link may provide point to point communication between two devices in either unidirectionally or bi-directionally. Being limited to transmitting data between two points, a serial link may transmit data between the devices independently of address information. However, these are merely examples of a serial link and embodiments of the present invention are not limited in this respect.

An "enumeration procedure" as referred to herein relates to a process controlled by a processing system to allocate resources to enable communication between processes hosted on the processing system and devices coupled to an I/O system. For example, an enumeration process may allocate data buffers in a system memory of a processing system for transmitting data to or receiving data from devices coupled to an I/O system. Also, an enumeration procedure may also initialize device drivers on the processing system corresponding with devices coupled to the I/O system. However, these are merely examples of an enumeration procedure and embodiments of the present invention are not limited in these respects.

A "configuration transaction" as referred to herein relates to an event in an enumeration procedure to allocate resources to a device coupled to a data bus or allocate resources to a device function. A configuration transaction may provide information to a processing system identifying a device or device function to enable allocation of resources to the device or device function. However, this is merely an example of a configuration transaction and embodiments of the present invention are not limited in this respect.

An enumeration procedure may initiate a configuration transaction by transmitting a "configuration request" addressed to a device or device function. For example, an enumeration procedure may initiate a bus transaction addressed to a targeted device or device function to initiate a configuration transaction to allocate resources to communicate with the targeted device or device function. However this is merely an example of a configuration request and embodiments of the present invention are not limited in this respect.

"Configuration header" as referred to herein relates to data provided by a device in response to a configuration request. For example, a device may provide a configuration header as formatted data comprising data fields with information identifying the device and/or resource requirements of one or more functions of the device in response to a request. However, this is merely an example of a configuration header and embodiments of the present invention are not limited in this respect.

A "system bus" as referred to herein relates to a data bus in a processing system coupling hardware resources of a processing system. For example, a system bus may comprise a data bus to couple a central processing unit (CPU) and main memory of a processing system. However, this is merely an example of a system bus and embodiments of the present invention are not limited in this respect.

A "bridge" as referred to herein relates to circuitry or logic coupled between a data bus and one or more devices to enable transmission of data between the data bus and the devices. For example, a bridge may enable devices to communicate with a data bus according to a protocol native to the data bus. However, this is merely an example of a bridge and embodiments of the present invention are not limited in this respect.

A bridge may be coupled to a processing system through a "primary bus." Such a bridge may also be coupled to a "secondary bus" to transmit data between the bridge and devices coupled to the secondary bus. Accordingly, the bridge may transmit data from devices coupled to the secondary bus toward the processing system through the primary bus. Similarly, the bridge may transmit data received from the processing system on the primary bus to devices coupled to the secondary bus. However, these are merely examples of primary and secondary busses coupled to a bridge, and embodiments of the present invention are not limited in these respects.

A "host bridge" as referred to herein relates to a bridge coupled between a system bus and an I/O system. For example, a host bridge may enable communication between a hardware resources of a processing system coupled to a system bus and one or more devices coupled to a hub or second data bus. However, this is merely an example of a host bridge and embodiments of the present invention are not limited in this respect.

A "root device" as referred to herein relates to a device to transmit data between a processing system and an input/output (I/O) system. Such a root device may comprise hub circuitry coupled to a system bus of a processing system to transmit data between processes hosted on the processing system and devices coupled to an I/O system. Also, a root device may comprise a host bridge coupling such a system bus to I/O devices. However, this is merely an example of a root device and embodiments of the present invention are not limited in this respect.

A "switch" as referred to herein relates to circuitry and logic to forward received data to one or more destinations. For example, a switch may comprise a plurality of ports and logic to forward data received on an ingress port to an egress port based upon destination information associated with the received data. However, this is merely an example of a switch and embodiments of the present invention are not limited in this respect.

A switch may be coupled to a processing system through a root device at an "upstream port" and coupled to other devices through one or more "downstream ports" to transmit data between the other devices and the processing system. Such a switch may also transmit data between the other devices through respective downstream ports. However, these are merely examples of an upstream port and a downstream port, and embodiments of the present invention are not limited in these respects.

"Routing information" as referred to herein relates to data associating destination addresses with physical destinations. For example, a "routing table" or "look up table" may comprise routing information to associate destination information of a data message or data packet with a physical destination (e.g., a port of a switch or device coupled to a port of a switch). However, these are merely examples of routing information, a routing table and look up table, and embodiments of the present invention are not limited in these respects.

Briefly, an embodiment of the present invention relates to a system and method of transmitting data in a processing platform. A switch may comprise an upstream port coupled to a root device to communicate with a processing system. The switch may also comprise a plurality of downstream ports where each downstream port is adapted to be coupled to a device. Data may be transmitted between downstream ports based upon routing information for transmitting data from the upstream port to each of the downstream ports. However, this is merely an example embodiment and other embodiments of the present invention are not limited in these respects.

Figure 1:
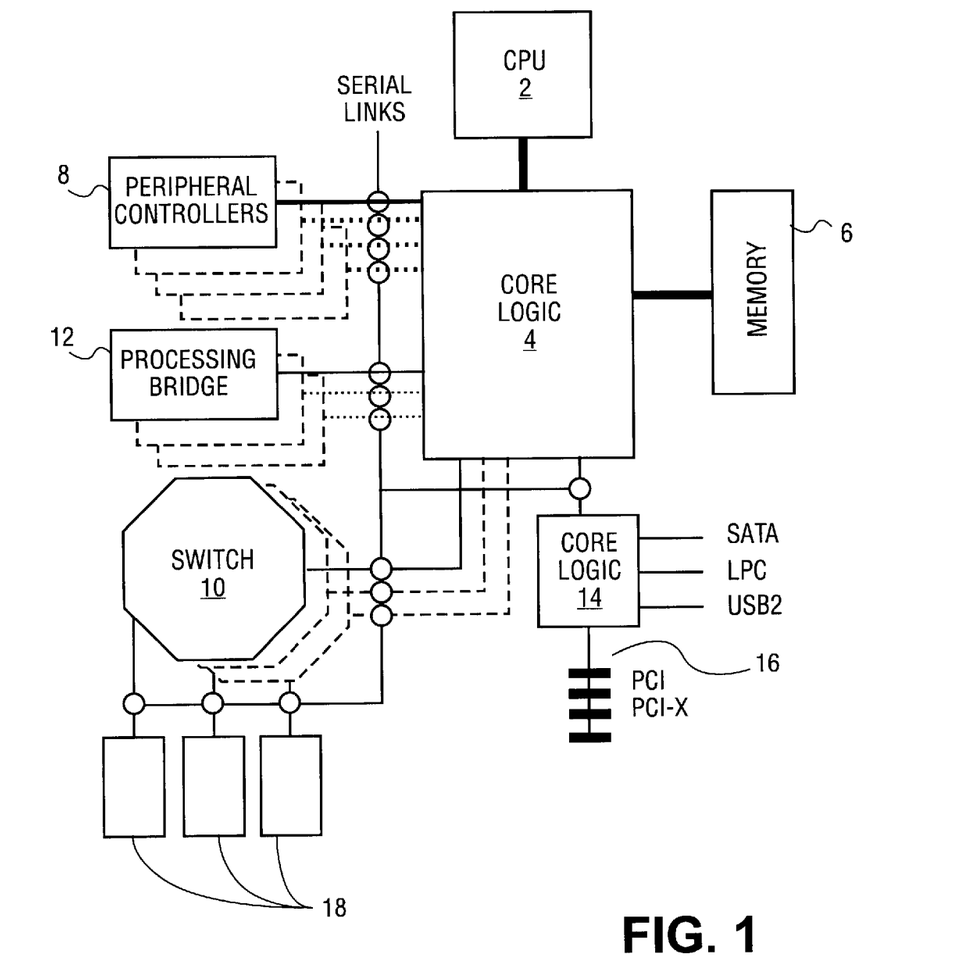
FIG. 1 shows a schematic diagram of a processing platform according to an embodiment of the present invention.

FIG. 1 shows a schematic diagram of a processing platform according to an embodiment of the present invention. A CPU 2 and system memory 6 are coupled to communicate with peripheral devices through core logic 4 providing a root device. The core logic 4 may comprise a memory bridge or a memory controller hub (MCH) made by Intel Corporation. However, this is merely an example of a root device and embodiments of the present invention are not limited in this respect. Peripheral devices coupled to the core logic 4 may include, for example, one or more communication ports 8, one or more processing bridges 12 (e.g., coupled to input/output (I/O) devices such as a storage processor), an I/O controller hub 14 and a switch 10. In the illustrated embodiment, the I/O hub controller 14 may also be coupled to devices adapted to communicate with processes hosted on the CPU 2 and system memory 6 according to a device protocol such as, for example, a Universal Serial Bus protocol or peripheral components interconnect protocol (PCI) (e.g., according to the PCI Local Bus Specification, Rev. 2.2, Dec. 18, 1998, PCI Special Interest Group, hereinafter the "PCI Local Bus Specification"). Additionally, each switch 10 may be coupled to one or more devices 18. However, this is merely an example of a processing platform and embodiments of the present invention are not limited in this respect.

Each switch 10 may comprise an upstream port coupled to the core logic 4 and a plurality of downstream ports coupled to devices 18. According to an embodiment, the switch 10 may facilitate upstream and downstream communication between a device 18 and the core logic 4 through the upstream port. The switch 10 may also facilitate direct peer-to-peer communication between devices 18 through corresponding downstream ports independently of the core logic 4. The switch 10 may receive data from the core logic 4 or devices 18 in a data message or data packet format indicating a destination. Accordingly, the switch 10 may comprise logic to determine an egress port for such a message or data packet based upon destination data associated with the data message or data packet. However, this is merely an embodiment of a switch as implemented in a processing platform and embodiments of the present invention are not limited in this respect.

According to an embodiment, destination data may comprise any data that may be associated with an egress port of the switch 10. For example, such destination data may comprise a information identifying a bus segment (e.g., bus number) or serial link for a configuration request packet or split completion packet. Also, destination data in a data message or data packet may comprise a memory map address as part of a non-configuration request packet. However, these are merely examples of destination data and embodiments of the present invention are not limited in this respect.

According to an embodiment, the devices 18 may comprise any one of several I/O devices such as, for example, an Ethernet controller coupled to a network, a small computer system interface (SCSI), a Fibrechannel interface or graphics controller interface. However, these are merely examples of devices which may be coupled to a downstream port of a switch and embodiments of the present invention are not limited in this respect.

According to an embodiment, the CPU 2 may execute one or more procedures to initialize the processing platform to enable processes hosted on the CPU 2 and system memory 6 to communicate with peripheral devices. For example, the CPU 2 may execute instructions stored in a non-volatile memory (not shown) as part of a basic I/O system (BIOS). Such instructions may be loaded to the system memory 6 and executed in response to a system reset event. Such BIOS instructions may initiate or control one or more enumeration processes to allocate resources to processes (e.g., initializing data bus drivers and device drivers) to communicate with corresponding data buses and devices by, for example, defining buffers in the system memory 6. However, this is merely an example of how a processing system may execute processes to initialize a processing platform and embodiments of the present invention are not limited in this respect.

In the illustrated embodiment, the switches 10 may be adapted to appears to the core logic 4 (and processes hosted on the CPU 2 and system memory 6) as a PCI device as defined in the PCI Local Bus specification. In this embodiment, an enumeration procedure may allocate resources at the processing platform to communicate with the switch 10 and devices 18 as PCI devices. However, this is merely an example of how a processing system may be adapted to communicate with a switch and devices coupled to ports of the switch, and embodiments of the present invention are not limited in this respect.

According to an embodiment, the CPU 2 may execute an enumeration procedure to, among other things, allocate resources to communicate with the devices 18 coupled to downstream ports of a switch 10 through the upstream port of the switch 10 and establish routing information to forward data messages or data packets from the upstream ports to the downstream ports. The switch 10 may then comprise logic to transmit data from a source downstream port to a destination downstream port based upon the collective routing information that was established for forwarding data messages or data packets from the upstream port to the destination downstream port. However, this is merely an example of how a switch may forward a data messages or data packet from a source downstream port to a destination downstream port and embodiments of the present invention are not limited in this respect.

Figure 2:
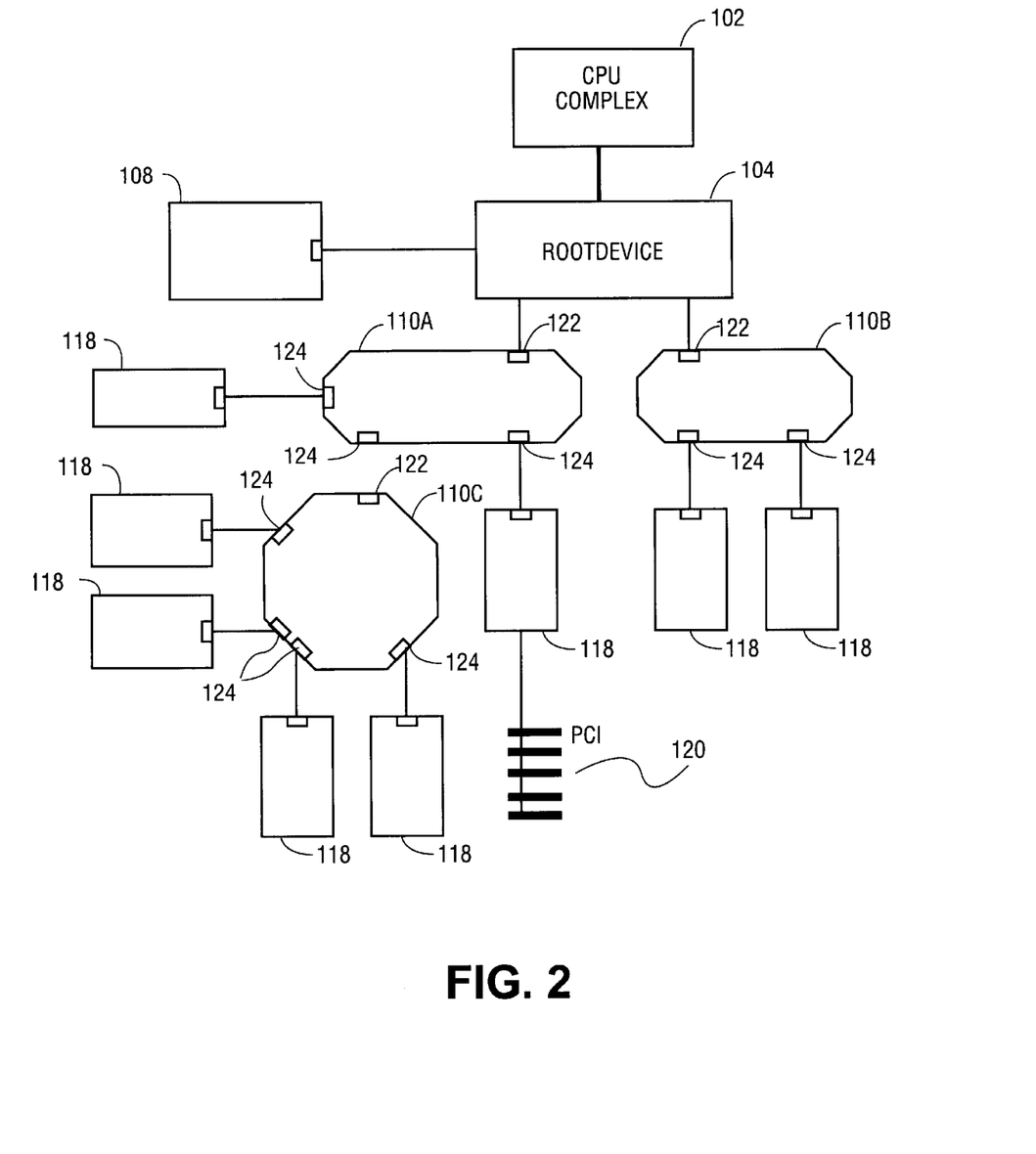
FIG. 2 shows a schematic diagram of a processing platform according to an alternative embodiment of the present invention.

FIG. 2 shows a schematic diagram of a processing platform according to an alternative embodiment of the present invention. A CPU complex 102 may comprise a processing system (e.g., comprising one or more CPUs and system memory) which communicates with peripheral devices through a root device 104. Switches 110 each comprise an upstream port 122 and a plurality of downstream ports 124 coupled to devices i 18. A device 118 may define an endpoint comprising circuitry to transmit data to or receive data from points on the processing platform. A device 118 may also define a bridge to a data bus of a legacy PCI system 120 according to the PCI Local Bus specification.

In the illustrated embodiment, a device 118 coupled to a downstream port 124 of a switch 110 may communicate with processes hosted on the CPU complex 102 through the upstream 122 of the switch 110. The CPU complex 102 may execute an enumeration procedure to configure the switches 110 and resources at the CPU complex 102 to enable communication with the devices 118. Such an enumeration procedure may comprise a procedure to enumerate the switches 110 and devices 118 as devices residing on a PCI bus structure.

In the illustrated embodiment, the upstream port 122 of the switch 110c is coupled to a downstream port 124 of the switch 110a. Accordingly, the switch 110a may act as a root device for the switch 110c and comprise logic to forward data messages or data packets from the switch 110c (e.g., data message or data packets originating at one of the devices 118 coupled to the switch 110c) to processes hosted at the CPU complex 102 through the upstream port 122 of the switch 110a. Similarly, the switch 110a may comprise logic to forward data messages or data packets from processes hosted on the CPU complex 102 (received on the upstream port 122 of the switch 110a) to the switch 110c and devices 118 coupled to downstream ports 124 of the switch 110c. However, these are merely examples of how a first switch may act as a root device to forward messages between a processing system and devices coupled to a second switch coupled to a downstream port of the first switch, and embodiments of the present invention are not limited in this respect.

According to an embodiment, devices 118 coupled to downstream ports 124 of the switch 110a may communicate with devices 118 coupled to the switch 110c independently of processes hosted on the CPU complex 102. For example, a device 118 coupled to a downstream port 124 of the switch 110c may transmit a data message or data packet to the switch 110c with destination data associated with a device 118 coupled to a downstream port 124 of the switch 110a. The switch 110c may then route the data message or data packet to the switch 110a through the (egress) upstream port 122 to be routed to the device 118 associated with the destination information. Similarly, a device coupled to a downstream port 124 of the switch 110a may transmit a data message or data packet to the switch 110a with destination data associated with a device 118 coupled to a downstream port 124 of the switch 110c. The switch 110a may then route the data message or data packet to the switch 110c through an egress downstream port 124 (of the switch 10a) to an ingress upstream port 122 (of the switch 110c) to be routed to the device 118 associated with the destination information. However, these are merely examples of how devices may forward data messages or data packets through switches and embodiments of the present invention are not limited in this respect.

According to an embodiment, the CPU complex 102 may execute an enumeration procedure to, among other things, allocate resources to communicate with the switches 110 and devices 118 coupled to downstream ports 124 of a switch 110 through the upstream port 122 of the switch 110. The enumeration procedure may also establish routing information to forward data messages or data packets from the upstream port 122 to the downstream ports 124. The switch 10 may then comprise logic to transmit data from a source downstream port 124 to a destination downstream port 124 based upon the routing information to forward data messages or data packets from the upstream port 122 to the destination downstream port 124. However, this is merely an example of how a switch may forward a data messages or data packet from a source downstream port to a destination downstream port and embodiments of the present invention are not limited in this respect.

Figure 3:
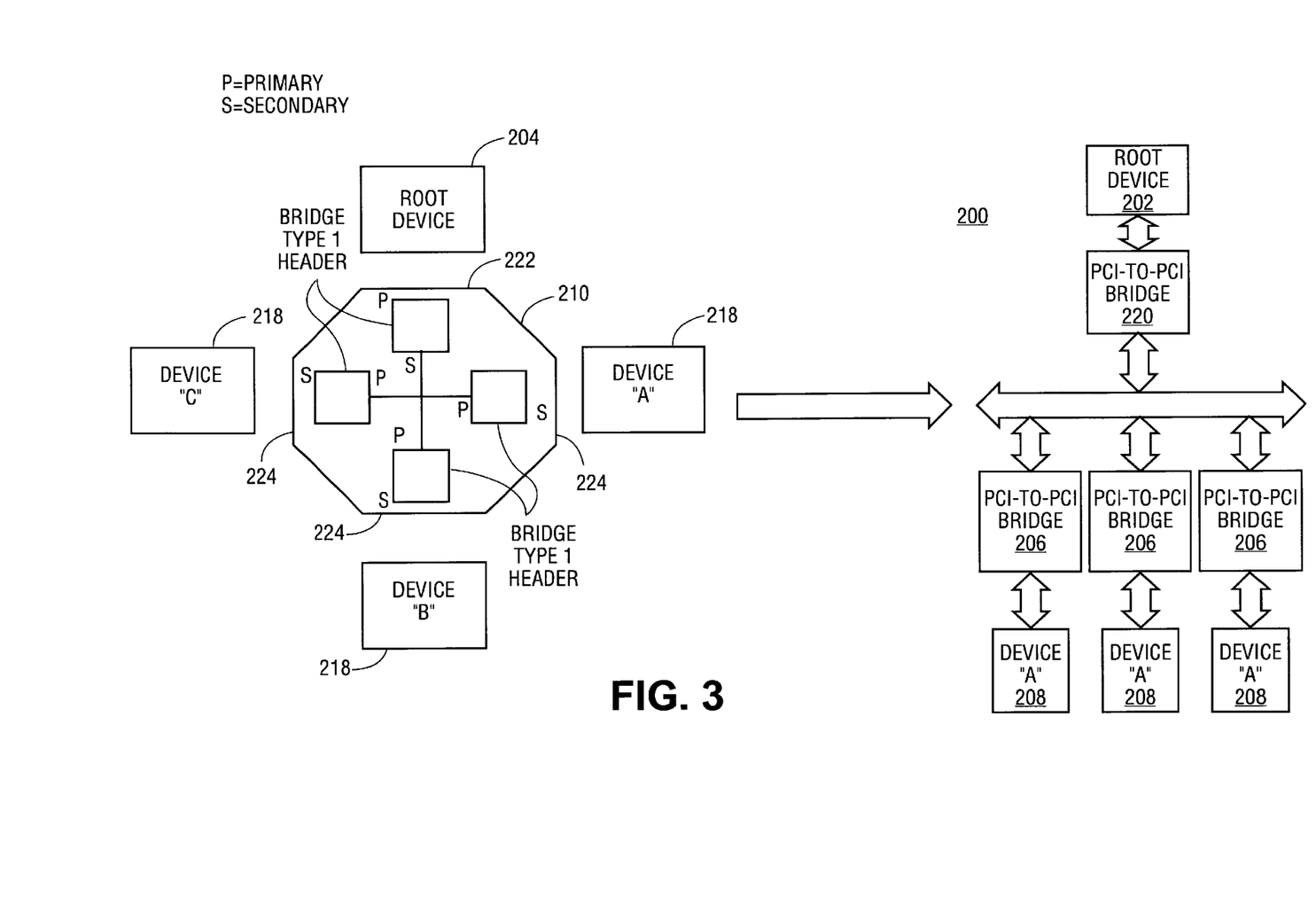
FIG. 3 shows a schematic diagram mapping of a multi-port switch to a representation of a PCI bus structure according to an embodiment of the processing platforms shown in FIGS. 1 and 2.

FIG. 3 shows a schematic diagram mapping of a multi-port switch to a representation of a "virtual" PCI bus structure according to an embodiment of the processing platforms shown in FIGS. I and 2. A switch 210 may comprise an upstream port 222 coupled to a root device 204 and a plurality of downstream ports 224 coupled to respective devices 218. In one embodiment, the devices 218 may be PCI devices adaptable to be placed on a slot of a PCI bus as described in the PCI Local Bus Specification. Alternatively, the devices 218 may comprise other interfaces to communicate with the downstream ports 224 according to other protocols such as, for example, Infiniband, Rapid I/O or Hyperdata Transport protocols. However, these are merely examples of an interface for devices which may be coupled to a downstream port of a switch and embodiments of the present invention are not limited in these respects.

According to an embodiment, the switch 210 comprises logic and circuitry to forward data messages or data packets received on a source ingress port (e.g., the upstream port 222 or a downstream port 224) to a different destination egress port (e.g., the upstream port 222 or a downstream port 224). For example, the switch 210 may comprise a switch fabric to store a received data message or data packet in a data buffer, associate destination address information associated with the received data message with the destination egress port, and forward the data message or data packet from the data buffer to the associated destination egress port. The switch 210 may comprise logic to associate the destination address information with routing information (e.g., routing information stored in a routing table or look-up table) to identify the destination egress port. However, this is merely an example of logic in a switch to forward data messages or data packets from an ingress port to an egress port, and embodiments of the present invention are not limited in this respect.

A processing system (not shown) may configure resources enabling processes hosted on the processing system to communicate with the devices 218 by executing an enumeration procedure. For example, the processing system may execute an enumeration procedure to configure resources to communicate with the switch 222 as PCI devices according to the PCI Local Bus Specification as illustrated in a virtual mapping 200. For example, routines in operating systems such as versions of Windows® sold by Microsoft Corporation, Linux, Solaris® sold by Sun Microsystems, or VxWorks® or pSOS® sold by WindRiver Systems, Inc. may execute an enumeration procedure to configure resources at the processing system according to the virtual mapping. However, these are merely examples of routines which may execute an enumeration procedure and embodiments of the present invention are not limited in this respect.

In the illustrated embodiment, the switch 210 may appear to the processing system as one or more devices coupled to a PCI bus at the root device 204. The switch 210 may comprise logic to respond to Type 0 or Type 1 configuration requests received at the upstream port 222 from a PCI enumeration procedure. In the course of an initial Type 0 configuration transaction, the switch 210 may provide a configuration header as illustrated in Chapter 3 of the PCI-to-PCI Bridge Architecture Specification, Rev. 1.1, Dec. 18, 1998, PCI Special Interest Group (hereinafter the "PCI-to-PCI Bridge Specification") to emulate or identify a "virtual" PCI-to-PCI bridge 220. The enumeration procedure may then allocate resources at the processing system to communicate with the upstream port 222 as the virtual PCI-to-PCI bridge 220.

Following the initial Type 0 configuration transaction at the upstream port 222, the enumeration procedure may initiate subsequent Type 1 configuration transactions (as illustrated in section 3.1.2.1.1 of the PCI-to-PCI Bridge Specification) at the upstream port 222 to allocate resources enabling communication with each of the downstream ports 224 as a virtual PCI-to-PCI bridge 206. In the course of each of these Type 1 configuration transactions, logic at the switch 210 may provide at the upstream port 222 a configuration header identifying a corresponding downstream port 224 as an emulated or virtual PCI-to-PCI bridge 206 coupled to a secondary bus of the virtual PCI-to-PCI bridge 220. Such logic at the switch 210 may emulate a Type 1 to Type 0 configuration transaction conversion as illustrated in Section 3.2 of the PCI-to-PCI Bridge Specification.

Following each Type 1 configuration transaction to configure resources at the processing system to communicate with a corresponding emulated or virtual PCI-to-PCI bridge 206, the enumeration procedure may initiate a subsequent Type 1 configuration at the upstream port 222 directed to the emulated or virtual PCI-to-PCI bridge 206. The switch 210 may comprise logic to provide a configuration header identifying a corresponding device 218 as a virtual PCI device 208 coupled to an emulated secondary bus of the emulated or virtual PCI-to-PCI bridge 206. Such logic at the switch 210 may emulate Type 1 to Type 1 configuration transaction forwarding as illustrated in section 3.1.2.1.2 of the PCI-to-PCI Bridge Specification.

According to an embodiment, a downstream port 224 may be coupled to a device 218 through a serial link (not shown). In response to a Type 1 configuration request to a corresponding virtual PCI-to-PCI bridge 206, the switch 210 may provide a response to emulate the presence of a PCI bus segment. In response to the indication from the switch 210, the enumeration procedure may associate a bus segment number with the serial link, and allocate resources to the serial link as a PCI bus segment with a single device. However, this is merely an example of how the presence of a bus segment may be emulated in an enumeration procedure and embodiments of the present invention are not limited in this respect.

In the illustrated embodiment, a downstream data message or data packet received at the upstream port 222 from the root device may be associated with destination information comprising an address. The switch 210 may comprise logic to define ranges of addresses for forwarding such downstream data messages to one of the devices 218 coupled to a downstream port 224. For example, the switch 210 may define base and limit registers for each address range associated with each downstream port. A data message received from the root device 204 having an address within an address range defined by such base and limit registers may then be forwarded to the downstream port 224 associated with the address range. The switch 210 may then ignore downstream messages from the root device having an address which does not fall within an address range associated with any of the downstream ports 224.

Figure 4:
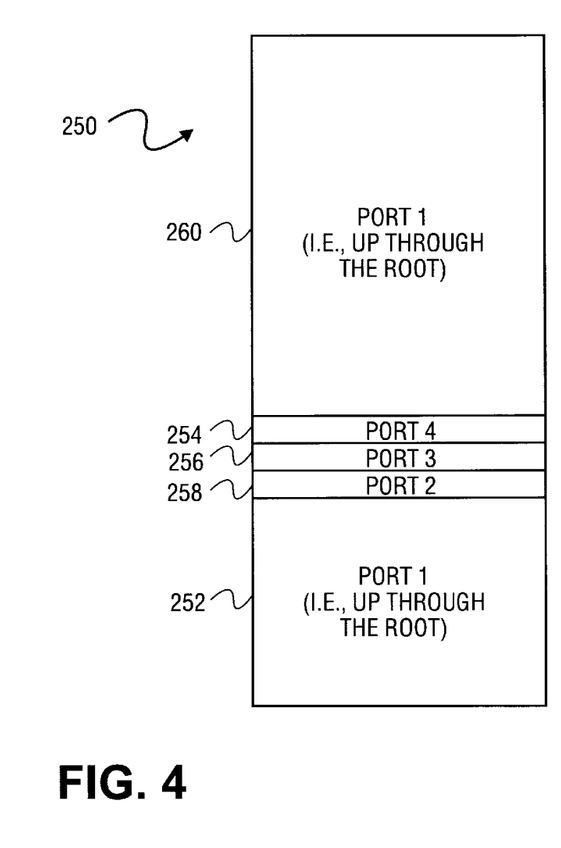
FIG. 4 shows a schematic diagram illustrating the formation of a routing table from a combination of decoded address ranges for transmitting downstream messages and inversely decoding for upstream routing according to an embodiment of the multi-port switch shown in FIG. 3.

According to an embodiment, the switch 210 may define base and limit registers for each address range in the course of an enumeration procedure. FIG. 4 shows a schematic diagram illustrating downstream forwarding address ranges over an address map 250 defined by a switch according to an embodiment of the multi-port switch 210 shown in FIG. 3. In the illustrated embodiment, the switch defines address ranges 254, 256 and 258 (e.g., including base and limit registers) for forwarding downstream messages to respective downstream ports. According to an embodiment, the enumeration procedure may model each downstream message address range for a downstream port as an address range for forwarding messages from a primary bus to a secondary bus of a virtual PCI-to-PCI bridge 206 corresponding with the downstream port. Similarly, the enumeration procedure may also model the union of the downstream message address ranges for all downstream ports (e.g., the union of the address ranges 254, 256 and 258) as an address range for forwarding messages from a primary bus to a secondary bus of the virtual PCI-to-PCI bridge 220.

According to an embodiment, the multi-port switch illustrated with reference to FIGS. 3 and 4 may comprise logic to inversely decode the address ranges 254, 256 and 258 (for forwarding downstream messages from the upstream port 222 to the downstream ports 224) to provide address ranges for forwarding messages from downstream ports 224 to the upstream port 222. Accordingly, the switch 210 may forward data messages or packets received at a downstream port 224 to the upstream port 222 if the received data message or packet is associated with a destination address in either address range 252 or 260. The processing system may then model the inverse decoding for forwarding data packets or data messages from the secondary bus to the primary bus of the virtual PCI-to-PCI bridge 220 as illustrated in Chapter 4 of the PCI-to-PCI Bridge Specification.

According to an embodiment, the switch 210 may also comprise logic to forward a data message or data packet received at a first downstream port 224 to a second, destination downstream port 224 independently of the processing system. Such logic at the switch 210 may use destination information associated with the received data message or data packet to inversely decode a destination downstream port 224 from the address ranges 254, 256 and 258 defined for forwarding messages from the upstream port 222. The switch 210 may then forward the received data message or data packet to the inversely decoded downstream port 224. However, this is merely an example of how a switch may forward data packets or messages from a first downstream port to a second downstream port, and embodiments of the present invention are not limited in this respect.

According to an embodiment, the switch 210 may comprise a memory to maintain routing information in a routing table to forward data message or data packets to a destination upstream port 222 or downstream port 224. For example, the switch 210 may comprise logic to build a look-up table to associate address ranges 254, 256 and 258 with respective downstream ports 224 in response to the enumeration procedure, and associate the remaining address ranges 252 and 260 with the upstream port 222. However, this is merely an example of how a switch may maintain routing information to forward data messages or data packets to destination ports and embodiments of the present invention are not limited in this respect.

Figure 5:
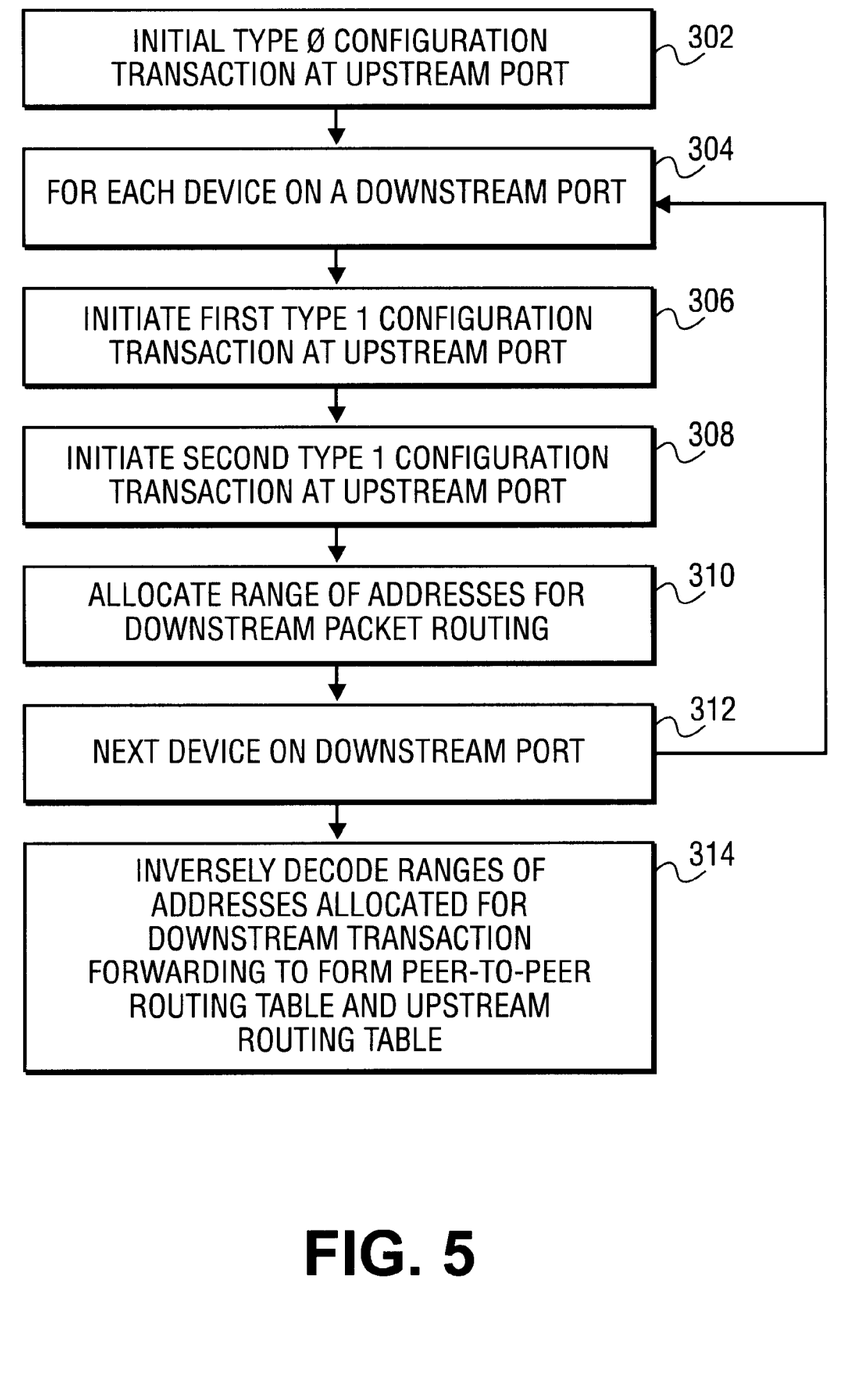
FIG. 5 shows a flow diagram illustrating an enumeration process according to an embodiment of the multi-port switch shown in FIG. 4.

FIG. 5 shows a flow diagram illustrating an enumeration procedure according to an embodiment of the multi-port switch shown in FIGS. 3 and 4. In the illustrated embodiment, a processing system may initiate an enumeration procedure to allocate resources to communicate with the switch 210 as one or more PCI devices using Type 0 and Type 1 configuration transactions as illustrated in Chapter 3 of the PCI-to-PCI Bridge Specification.

At block 302, a Type 0 configuration transaction is initiated at an upstream port of a switch, and the upstream port may return a configuration header identifying a virtual PCI-to-PCI bridge. The enumeration procedure may then initiate subsequent configuration transactions at the upstream port to enumerate additional devices located "behind" the upstream port (e.g., directed to a device coupled to the secondary bus of the virtual PCI-to-PCI bridge) at blocks 306 through 310. For each downstream port of the switch, the enumeration procedure at block 306 may initiate a Type 1 configuration transaction (including a Type 1 to Type 0 conversion) at the upstream port to enumerate the downstream port as a virtual PCI-to-PCI bridge on a secondary bus of the virtual PCI-to-PCI bridge corresponding with the upstream port as illustrated in section 3.1.2.1.1 of the PCI-to-PCI Bridge Specification.

The upstream port may provide a configuration header identifying an associated downstream port as a PCI-to-PCI bridge in response to the Type 1 configuration transaction initiated at block 306. Accordingly, the enumeration procedure may initiate a subsequent Type 1 configuration transaction at block 308 directed to a device on the secondary bus of the virtual PCI-to-PCI bridge corresponding with the downstream port (including a Type 1 to Type 1 forwarding) as illustrated in section 3.1.2.1.2 of the PCI-to-PCI Bridge Specification. In response to the Type 1 configuration transaction initiated at block 310, the upstream port may provide a configuration header identifying the device coupled to the downstream port as a PCI device.

According to an embodiment, the switch comprises logic to provide a configuration header at the upstream port in response to the Type 1 configuration transaction initiated at block 308 based upon information identifying the device coupled to the downstream port. For example, the device at the downstream port may transmit a configuration header to the switch identifying the device as a PCI device. The switch may then forward the configuration header to the upstream port in response to the Type 1 configuration transaction. Alternatively, the switch may comprise logic to form a configuration based upon information identifying one or more functions of the device received at the downstream port. However, this is merely an example of how switch may form a PCI configuration header to characterize a device or function of a device coupled to a downstream port, and embodiments of the present invention are not limited in this respect.

At block 310, the switch may define a range of addresses for forwarding messages from the upstream port to the device. Such a range of addresses may be represented by base and limit registers defined at the upstream port. Following the enumeration procedure at blocks 302 through 312, the switch may use inverse decoding to forward messages from downstream ports to the upstream port, or from a first downstream data port to a second downstream data port as discussed above with reference to FIG. 4.. For example, the switch may comprise logic to extract routing information from inversely decoding the address ranges associated with the downstream data ports to form a routing table. The routing table may then be used to forward data messages from a source downstream port to the upstream port or a destination downstream port.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A system comprising:
    a processing system;
    a root device coupled to the processing system; and
    a switch comprising:
        an upstream port coupled to the root device to communicate with the processing system;
        a plurality of downstream ports, each downstream port being adapted to be coupled to a device; and
        logic to transmit data between the downstream ports based upon routing information for transmitting data from the upstream port to each of the downstream ports.

2. The system of claim 1, wherein the switch further comprises:
    logic to program a routing table in response to a bus enumeration procedure, the routing table associating each downstream port with a bus address; and
    logic to transmit data from a source downstream port to a destination downstream port based upon information in the routing table associated with the destination downstream port.

3. The system of claim 2, wherein the switch further comprises:
    logic to provide a first configuration header at the upstream port in response to a configuration transaction addressed to the upstream port; and
    logic to provide a second configuration header at the upstream port in response to a configuration transaction addressed to a downstream port.

4. The system of claim 3, wherein the first configuration header comprises information identifying the upstream port as a first bridge and the second configuration header comprises information identifying the downstream port as a second bridge coupled to a secondary bus of the first bridge, and wherein the switch further comprises logic to provide a third configuration header at the upstream port in response to a configuration transaction addressed to a device coupled to the downstream port.

5. The system of claim 1, wherein the switch further comprises:
    logic to associate a range of addresses for routing data from the upstream port to each device in response to a configuration transaction; and
    logic to route data from a source downstream port to a destination downstream port based upon the range of address associated with the destination downstream port.

6. The system of claim 5, wherein the switch further comprises logic to forward data messages or data packets received on a downstream port to the upstream port in response to detecting that the data messages or data packets are associated with an address that is not in the range of addresses associated with any other downstream port.

7. The system of claim 1, wherein the system comprises:
    a first switch comprising:
        a first upstream port coupled to the root device to communicate with the processing system;
        a plurality of downstream ports, each downstream port being adapted to be coupled to a device; and
    a second switch comprising:
        a second downstream port coupled to a downstream port of the first switch; and
        a plurality of downstream ports, each downstream port being adapted to be coupled to a device.

8. The system of claim 1, wherein the routing information comprises information to associate destination information of data messages received from the root device with the downstream port.

9. The system of claim 1, wherein the system further comprises a device coupled to at least one of the downstream ports comprising an Ethernet controller.

10. The system of claim 1, wherein the system further comprises a device coupled to at least one of the downstream ports capable of transmitting or receiving data at a Small Computer System Interface.

11. The system of claim 1, the system further comprising a graphics controller coupled to at least one of the downstream ports.

12. A method comprising:
associating at least one of a plurality of downstream ports of a switch with a range of addresses in response to a configuration transaction;
receiving a data transmission at an upstream port of the switch, the received data transmission comprising a destination address;
determining whet her the destination address is within the range of addresses; and
transmitting the received data transmission to the destination downstream port.

13. The method of claim 12, wherein the method further comprises:
receiving a second data transmission at a source downstream port, the second data transmission comprising a second destination address;
associating the second destination address with a range of addresses of a second destination downstream port; and
transmitting the second received data transmission to the second destination downstream port.

14. The method of claim 13, Wherein the method further comprises:
receiving a third data transmission at a second source downstream port, the third data transmission comprising a third destination address, the third destination not being a range of addresses of any of the downstream ports; and
transmitting the third received data transmission to the upstream port.

15. The method of claim 12, the method further comprising providing a configuration header at the upstream port in response to each configuration transaction.

16. The method of claim 15, the method further comprising providing type 1 header data in response to each configuration transaction directed to a device port.

17. The method of claim 12, the method further comprising:
providing a first configuration header at the upstream port in response to a configuration transaction addressed to the upstream port; and
providing a second configuration header at the upstream port in response to a configuration transaction addressed to a downstream port.

18. The method of claim 17, wherein the first configuration header comprises information identifying the upstream port as a first bridge and the second configuration header comprises information identifying the downstream port as a second bridge coupled to a secondary bus of the first bridge, and wherein the method further comprises providing a third configuration header at the upstream port in response to a configuration transaction addressed to a device coupled to the downstream port.

19. A switch comprising:
an upstream port adapted to be coupled to a root device;
a plurality of downstream ports, each downstream port being adapted to be coupled to a device; and
logic to transmit data between the downstream ports based upon routing information for transmitting data from the upstream port to each of the downstream ports.

20. The switch of claim 19, wherein the switch further comprises:
logic to program a routing table in response to a bus enumeration procedure, the routing table associating each downstream port with a bus address; and
logic to transmit data from a source downstream port to a destination downstream port based upon information in the routing table associated with the destination downstream port.

21. The switch of claim 20, wherein the switch further comprises:
logic to provide a first configuration header at the upstream port in response to a configuration transaction addressed to the upstream port; and
logic to provide a second configuration header at the upstream port in response to a configuration transaction addressed to a downstream port.

22. The switch of claim 21, wherein the first configuration header comprises information identifying the upstream port as a first bridge and the second configuration header comprises information identifying the downstream port as a second bridge coupled to a secondary bus of the first bridge, and wherein the switch further comprises logic to provide a third configuration header at the upstream port in response to a configuration transaction addressed to a device coupled to the downstream port.

23. The switch of claim 19, wherein the switch further comprises:
logic to associate a range of addresses for routing data from the upstream port to each device in response to a configuration transaction; and
logic to route data from a source downstream port to a destination downstream port based upon the range of address associated with the destination downstream port.

24. The switch of claim 23, wherein the switch further comprises logic to forward data messages or data packets received on a downstream port to the upstream port in response to detecting that the data messages or data packets are associated with an address that is not in the range of addresses associated with any other downstream port.

25. The switch of claim 19, wherein the routing information comprises information to associate destination information of data messages received from the root device with the downstream port.

26. An apparatus comprising:
means for associating at least one of a plurality of downstream ports of a switch with a range of addresses in response to a configuration transaction associated with the downstream port;
means for receiving a data transmission at an upstream port of the switch, the received data transmission comprising a destination address;
means for determining whether the destination address is within the range of addresses; and
means for transmitting the received data transmission to the destination downstream port.

27. The apparatus of claim 26, the apparatus further comprising:
    means for receiving a second data transmission at a source downstream port, the second data transmission comprising a second destination address;
    means for associating the second destination address with a range of addresses of a second destination downstream port; and
    means for transmitting the second received data transmission to the second destination downstream port.

28. The apparatus of claim 27, the apparatus further comprising:
    means for receiving a third data transmission at a second source downstream port, the third data transmission comprising a third destination address, the third destination not being a range of addresses of any of the downstream ports; and
    means for transmitting the third received data transmission to the upstream port.

29. The apparatus of claim 27, the apparatus further comprising means for providing type 1 header data in response to each configuration transaction directed to a downstream port.

30. The apparatus of claim 26, the apparatus further comprising means for providing a configuration header at the upstream port in response to each configuration transaction.

31. The apparatus of claim 30, wherein the first configuration header comprises information identifying the upstream port as a first bridge and the second configuration header comprises information identifying the downstream port as a second bridge coupled to a secondary bus of the first bridge, and wherein the apparatus further comprises means for providing a third configuration header at the upstream port in response to a configuration transaction addressed to a device coupled to the downstream port.

32. The apparatus of claim 26, the apparatus further comprising:
    means for providing a first configuration header at the upstream port in response to a configuration transaction addressed to the upstream port; and
    means for providing a second configuration header at the upstream port in response to a configuration transaction addressed to a downstream port.

33. A system comprising:
    a processing system;
    a root device coupled to the processing system; and
    a switch comprising:
        an upstream port coupled to the root device to communicate with the processing system;
        a plurality of downstream ports, each downstream port being adapted to be coupled to a device; and
        logic to emulate a presence of a bridge in response to a configuration request received from the processing system at the upstream port.

34. The system of claim 33, wherein the switch further comprises logic to emulate a presence of a data bus coupled to the emulated presence of the bridge in response to a configuration request received at the upstream port.

35. The system of claim 33, wherein the switch further comprises for each downstream port logic to emulate a presence of a bridge in response to a configuration request received at the upstream port.

36. The system of claim 35, wherein the switch further comprises logic to emulate a presence of a secondary bus segment coupled to the emulated presence of the bridge associated with the downstream port in response to a presence of a serial link coupled to the downstream port.

37. The system of claim 36, wherein the switch further comprises logic to emulate a presence of a device coupled to the emulated presence of the secondary bus segment in response to a presence of a device coupled to the downstream port through the serial link.

38. The system of claim 33, where the system further comprises a device coupled to at least one of the downstream ports comprising an Ethernet controller.

39. The system of claim 33, wherein the system further comprises a device coupled to at least one of the downstream ports capable of transmitting or receiving data at a Small Computer System Interface.

40. The system of claim 33, the system further comprising a graphics controller coupled to at least one of the downstream ports.

41. A switch comprising:
    an upstream port adapted to be coupled to a root device;
    a plurality of downstream ports, each downstream port being adapted to be coupled to a device; and
    logic to emulate a presence of a bridge in response toga configuration request received from the processing system at the upstream port.

42. The switch of claim 41, wherein the switch further comprises logic to emulate a presence of a secondary data bus coupled to the emulated presence of the bridge in response to a configuration request received at the upstream port.

43. The switch of claim 41, wherein the switch further comprises for each downstream port logic to emulate a presence of a bridge in response to a configuration request received at the upstream port.

44. The switch of claim 43, wherein the switch further comprises logic to emulate a presence of a secondary bus segment coupled to a bridge in response to a presence of a serial link coupled to the downstream port.

45. The switch of claim 44, wherein the switch further comprises logic to emulate a presence of a device coupled to the emulated bus segment.in response to a presence of a device coupled to the downstream port through the serial link.

46. A method comprising:
    receiving a configuration request at an upstream port of a switch; and
    emulating a presence of a bridge in response to the configuration request.

47. The method of claim 46, wherein the method further comprises emulating a presence of a bridge in response to a configuration request received at the upstream port for each of a plurality of downstream ports of the switch.

48. The method of claim 47, wherein the method further comprises emulating a presence of a secondary data bus segment coupled to the emulated presence of the bridge in response to a configuration request received at the upstream port.

49. The method of claim 47, wherein the method further comprises emulating a presence of a bus secondary segment coupled to an emulated presence of the bridge associated with the downstream port in response to a presence of a serial link coupled to the downstream port.

50. The method of claim 49, wherein the method further comprises emulating a presence of a device coupled to the emulated secondary bus segment in response to a presence of a device coupled to the downstream port through the serial link.

* * * * *

UNITED STATES PATENT AND TRADEMARK OFFICE
CERTIFICATE OF CORRECTION

PATENT NO. : 6,606,679 B2
DATED : August 12, 2003
INVENTOR(S) : Solomon et al.

It is certified that error appears in the above-identified patent and that said Letters Patent is hereby corrected as shown below:

Column 6,
Line 56, delete "i 18", insert -- 118 --.

Column 13,
Line 22, delete "whet her", insert -- whether --.

Signed and Sealed this

Twenty-third Day of December, 2003

JAMES E. ROGAN
*Director of the United States Patent and Trademark Office*